United States Patent [19]
Kanehiro et al.

[11] Patent Number: 5,131,369
[45] Date of Patent: Jul. 21, 1992

[54] IGNITION TIMING CONTROL SYSTEM FOR INTERNAL COMBUSTION ENGINE

[75] Inventors: Masaki Kanehiro; Yukio Miyashita; Yoshiaki Akimoto, all of Wako, Japan

[73] Assignee: Honda Giken Kogyo Kabushiki Kaisha, Tokyo, Japan

[21] Appl. No.: 737,079

[22] Filed: Jul. 29, 1991

[30] Foreign Application Priority Data

Aug. 11, 1990 [JP] Japan ................. 2-213188
Aug. 11, 1990 [JP] Japan ................. 2-213190

[51] Int. Cl.⁵ .................................. F02P 5/15
[52] U.S. Cl. .................................. 123/425
[58] Field of Search .................. 123/425, 435

[56] References Cited

U.S. PATENT DOCUMENTS

| | | | |
|---|---|---|---|
| 4,630,584 | 12/1986 | Higashiyama et al. | 123/425 |
| 4,854,286 | 8/1989 | Chemnitzer | 123/435 X |
| 4,898,139 | 2/1990 | Kitayama et al. | 123/425 |
| 4,913,116 | 4/1990 | Katogi et al. | 123/435 X |
| 4,934,327 | 6/1990 | Hidaka | 123/425 |
| 4,947,817 | 8/1990 | Ido | 123/425 |

FOREIGN PATENT DOCUMENTS

| | | |
|---|---|---|
| 0138495 | 4/1985 | European Pat. Off. . |
| 0311097 | 4/1989 | European Pat. Off. . |
| 224468 | 9/1989 | Japan . |

Primary Examiner—Tony M. Argenbright
Attorney, Agent, or Firm—Armstrong, Nikaido, Marmelstein, Kubovcik & Murray

[57] ABSTRACT

A system for controlling ignition timing of a vehicle internal combustion engine, in which a plurality of sets of ignition timing control characteristics are established in response to the octane numbers of different kinds of fuel which may intentionally or unintentionally be used in the vehicle. The system infers the octane number of the fuel being used from the occurrence state of knock and selects the set of control characteristics corresponding to the selected fuel octane number, whereafter it determines the ignition timing based on the selected set of control characteristics. The system overcomes the disadvantages of the conventional system, namely that when the set of characteristics for low octane number fuel is misselected when the vehicle is running on high octane number fuel, resulting in unnecessary reduction of output torque, either the conditions under which it is possible to forcibly shift to the set of conditions for high octane number fuel are limited to special ones, specifically to low engine speed operating condition, or if not so limited, the knock which occurs when the forcible shift is carried out causes a shift in the opposite direction, whereby the control experiences undesirable hunting.

19 Claims, 11 Drawing Sheets

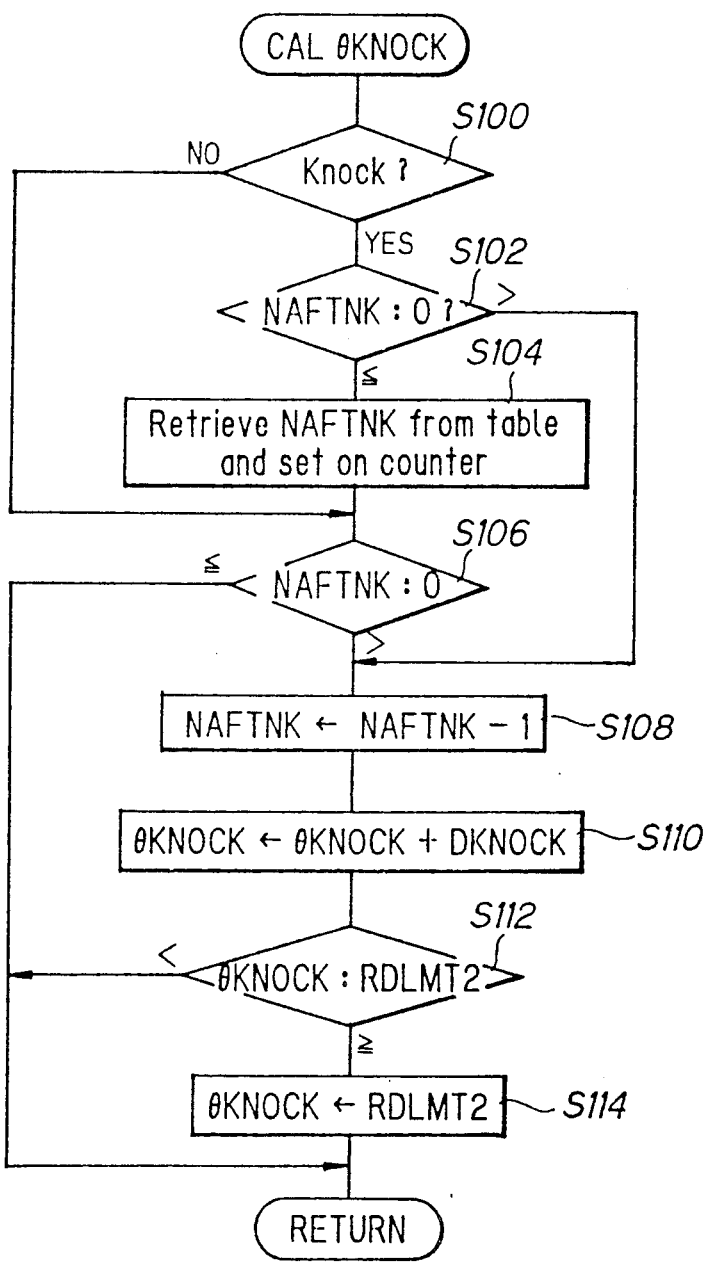

(SRH DADV)
↓
Retrieve DADV from map — S202A
↓
(RETURN)

High engine speed ↓ , High load →

| NE \ PB | P_BKN0 | P_BKN1 | P_BKN2 |
|---|---|---|---|
| ∧ — N_ACT0 | DADV 00 | 01 | 02 |
| ∧ — N_ACT1 | 10 | 11 | 12 |
| ∧ — N_ACT2 | 20 | 21 | 22 |
| ∧ — N_ACT3 | 30 | 31 | 32 |
| ∧ | 40 | 41 | 42 |

IGNITION TIMING CONTROL SYSTEM FOR INTERNAL COMBUSTION ENGINE

BACKGROUND OF THE INVENTION

1. Field of the Invention

This invention relates to an ignition timing control system for internal combustion engines, more particularly to an ignition timing control system for vehicle internal combustion engines having a plurality of sets of ignition timing control characteristics corresponding to fuels with different octane numbers that conducts knock control based on a selected characteristics set, and still more particularly to such an ignition timing control system for vehicle internal combustion engines which under specific conditions replaces the selected set of characteristics as a relief measure when the selection has been made based on an erroneous determination.

2. Description of the Prior Art

In response to rising user demand for high power internal combustion engines, automobile manufacturers have in recent years been offering an increasing number of engines designed to use high octane number fuel. In such engines the ignition timing has to be set differently between the case where the fuel actually used has the intended octane number and the case where it does not, since the fuel actually used does not always have the intended octane number. The engine is therefore provided with different sets of ignition timing control characteristics corresponding to different octane numbers. The control system is designed to determine or presume the octane number of the fuel being used from the occurrence state of engine knock and to select one set of control characteristics corresponding to the determined fuel octane number for ignition timing control. Such a system is disclosed, for example, in Japanese Laid-open Patent Publication No. 1(1989)-96473.

Conventional systems provided with a plurality of sets of control characteristics have a drawback, however, in that the octane number of the fuel may be erroneously determined to be lower than the actual octane number, in which case characteristics which retard the ignition timing more than required are selected. As a result, the engine output may be needlessly reduced. It therefore becomes necessary, at a time when the operation condition of the engine is appropriate, to cancel the selected characteristics and select control characteristics for shifting the ignition timing in the advance direction. This thinking is applied, for example, in the invention set out in the assignee's Japanese Laid-open Patent Publication No. 1-224468 (Application No. 63(1988)-51268.) Specifically, the system disclosed in this publication waits until the engine speed has remained below a prescribed level for a prescribed period of time and then forcibly shifts or switches over to control characteristics further in the direction of advanced ignition timing.

With this system, however, when control characteristics are erroneously selected, for example, during vehicle acceleration, shift to appropriate control characteristics is not conducted unless the engine speed falls below the prescribed level. Moreover, it may happen that the control characteristics are shifted (advanced) to those appropriate for a high octane number fuel when in fact the engine is running on low octane number fuel using appropriately retarded control characteristics. The knock which occurs in this case causes the system to shift back to the low octane number characteristics, with the result that "hunting" occurs in which the system switches back and forth between the two sets of characteristics. The control is thus unstable. Further, if the characteristics is easily shifted to the more advanced one, the operator might experience unpleasant feeling owing to the sudden torque change caused by the ignition timing change.

SUMMARY OF THE INVENTION

In view of the foregoing, one object of the present invention is to provide an ignition timing control system for vehicle internal combustion engines for overcoming the aforesaid problems of the conventional systems.

Another object of the invention is to provide such a system in which shift to appropriate control characteristics from control characteristics erroneously selected even during vehicle acceleration is conducted without waiting for the engine speed to decrease so that unnecessary engine output torque loss is avoided.

Still another object of the invention is to provide such a system in which shift to the appropriate ignition timing control characteristics is implemented without giving rise to control hunting.

Still further object of the invention is to provide such a system in which shift to the appropriate ignition timing control characteristics is implemented without causing unpleasant feeling to the operator owing to sudden torque change.

This invention achieves these objects by providing an ignition timing control system for vehicle internal combustion engines including first means for detecting operating conditions of the engine including at least engine speed and engine load, second means for detecting knock occurring in the engine, third means for establishing a plurality of sets of ignition timing control characteristics for different fuel octane numbers including at least a first set of characteristics for fuel having a prescribed octane number and a second set of characteristics for fuel having a greater octane number, control means for inferring the octane number of fuel being used from the detected occurrence state of knock and selecting one set of control characteristics corresponding thereto, and for determining ignition timing based on the selected set of characteristics in response to the detected engine operating conditions and the occurrence state of knock, and ignition means for igniting an air-fuel mixture in a combustion chamber of engine. In the system, it is arranged such that said control means, after determination of the ignition timing based on the first set of characteristics, advances the ignition timing by a prescribed amount if the engine load is found to be above a predetermined load, and shifts the selected set of characteristics from the first set to the second set when it has been confirmed that no knock occurred in the course of advancement.

BRIEF EXPLANATION OF THE DRAWINGS

These and other objects and advantages of the invention will be more apparent from the following description and drawings, in which:

FIG. 5 is a flowchart of a routine for calculating a knock adjustment value in the retard direction, which is used for determining the zones;

DETAILED DESCRIPTION OF PREFERRED EMBODIMENTS

The invention will now be explained with reference to specific embodiments.

Figure 1:
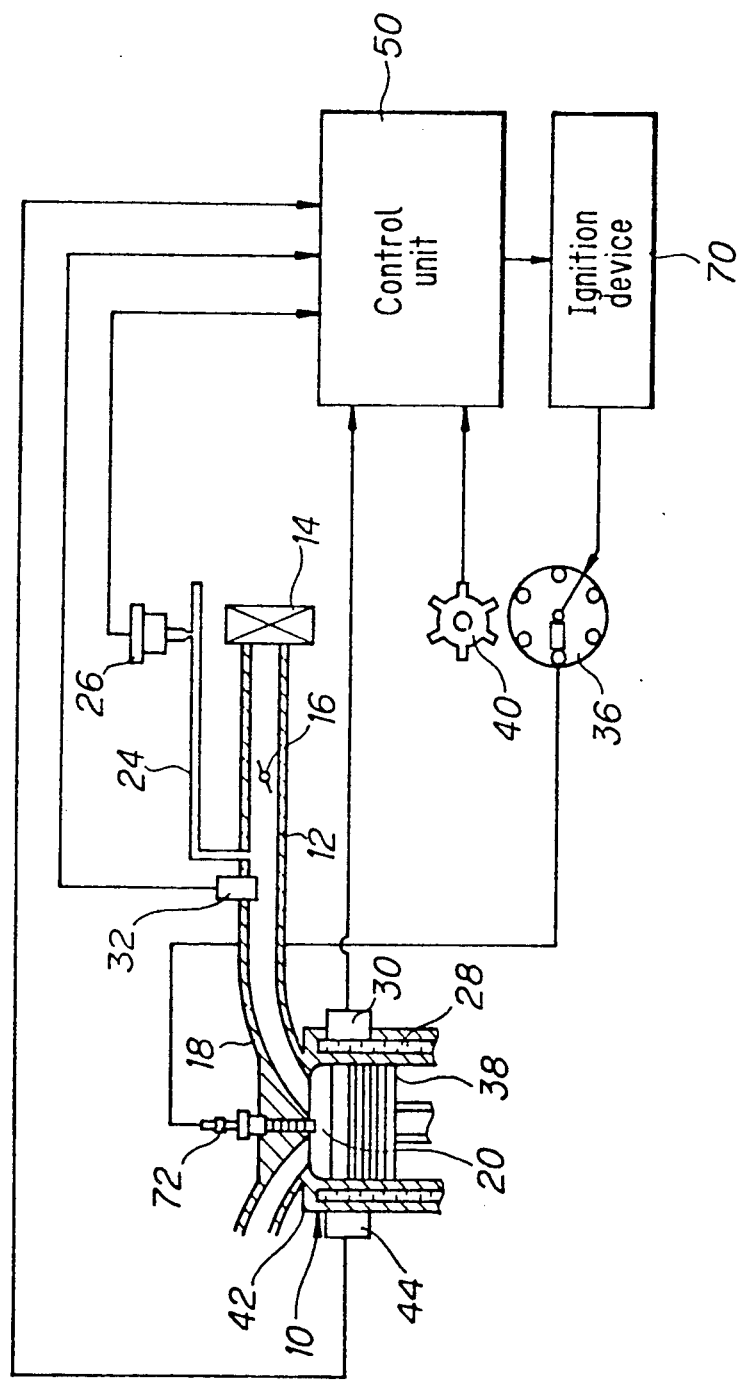
FIG. 1 is a schematic view of an ignition timing control system for internal control engines according to the present invention.

FIG. 1 shows the overall arrangement of an ignition timing control system for internal combustion engines in accordance with this invention. A six-cylinder vehicle internal combustion engine 10 has an air intake passage 12 provided at its distal end with an air cleaner 4. Air drawn in through the air cleaner 14 has its flow rate controlled by a throttle valve 16 and passes through a manifold 18 to combustion chambers 20 (only one shown). A pipe 24 branches off from the air intake passage 12 at an appropriate position downstream of the throttle valve 16. The pipe 24 is provided near its far end with an intake air pressure sensor 26 which detects the engine load by measuring the absolute value of the intake air pressure. A coolant temperature sensor 30 is provided in the vicinity of a coolant passage 28 of the internal combustion engine 10 for detecting the temperature of the engine coolant and an intake air temperature sensor 32 is provided in the air intake passage 12 at an appropriate position downstream of the throttle valve 16 for detecting the temperature of the air drawn into the engine.

The internal combustion engine 10 has a distributor 36 which includes a crank angle sensor 40 comprised of a magnet which rotates in synchronism with a crankshaft (not shown) rotated by the reciprocal motion of pistons 38 (only one shown) and a stationary member disposed opposite the magnet. The crank angle sensor 40 outputs a pulse signal once every predetermined angle of crankshaft rotation. At an appropriate location on the block 42 of the internal combustion engine 10 is provided a piezoelectric knock sensor 44 for detecting vibration produced by combustion knock arising within the combustion chambers 20. The outputs of the intake air pressure sensor 26 and the other sensors 30, 32, 40 and 44 are forwarded to a control unit 50.

Figure 2:
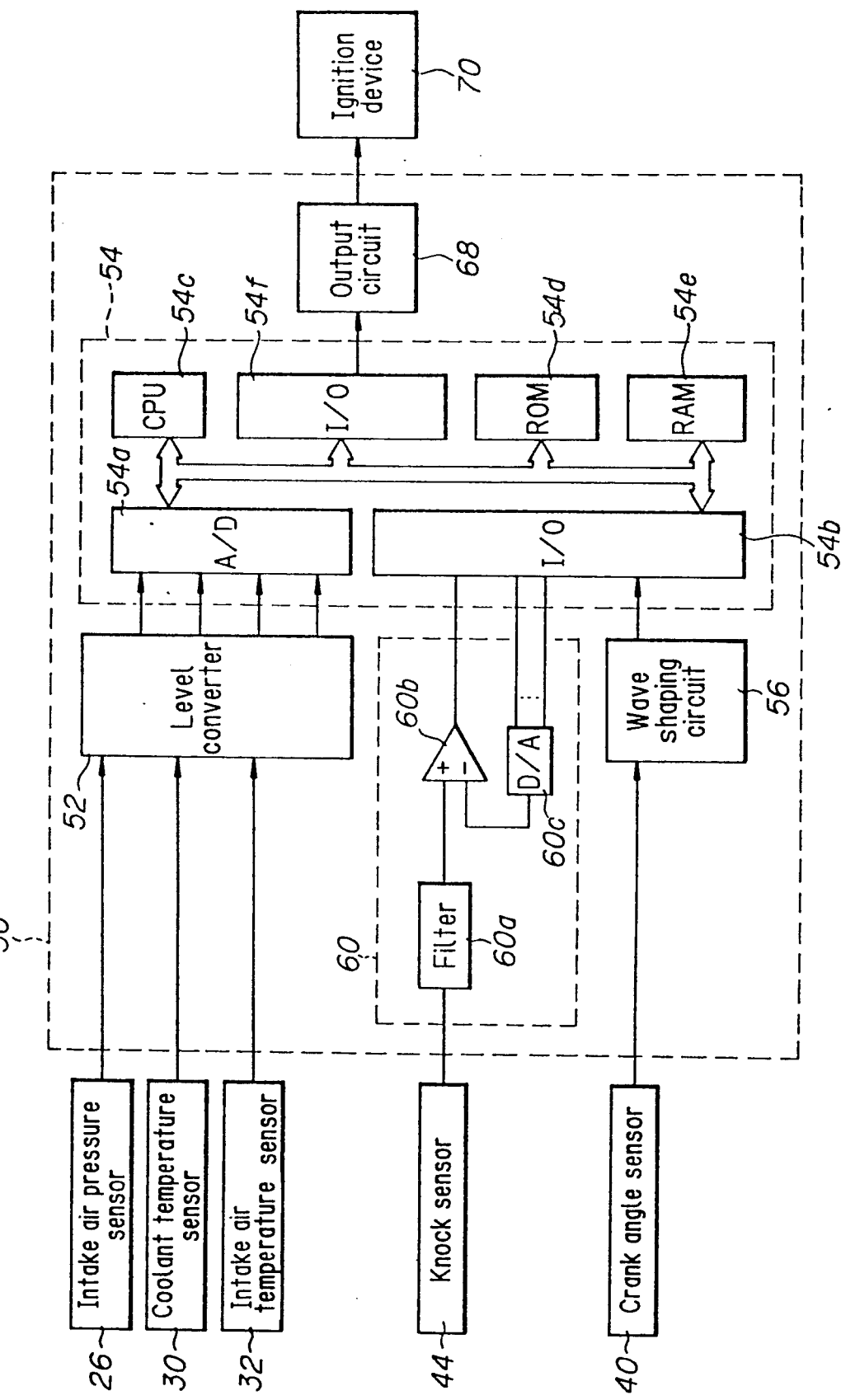
FIG. 2 is a block diagram showing the detailed arrangement of the control unit of the system made up of a microcomputer of FIG. 1.

The arrangement of the control unit 50 is illustrated in FIG. 2. The outputs from the intake air pressure sensor 26, the coolant temperature sensor 30 and the intake air temperature sensor 32 are input to a level converter 52 in the control unit 50 for adjustment to a prescribed level and are then forwarded to a microcomputer 54. The microcomputer 54 comprises an A/D converter 54a, I/O circuits 54b,54f, a CPU (central processing unit) 54c, a ROM (read-only memory) 54d, a RAM (random access memory) 54e, and counters for computation and timers (the two last mentioned members not being shown). The signals output by the level converter 52 are converted to digital values by the A/D converter 54a in accordance with commands from the CPU 54c and are then temporarily stored in the RAM 54e. The digital outputs of the crank angle sensor 40 etc. are shaped in a wave shaping circuit 56 and then input to the microcomputer 54 through an I/O circuit 54b.

After being sent to the control unit 50, the output from the knock sensor 44 is input to a knock detection circuit 60. The knock detection circuit 60 comprises a filter 60a, a comparator 60b and a D/A converter 60c. The occurrence of combustion knock is detected in the comparator 60b by comparing a reference value received from the microcomputer 54 through the D/A converter 60c with the sensor output value received through the filter 60a.

The microcomputer 54 calculates the engine speed from the output of the crank angle sensor 40 and determines the engine load from the output of the pressure sensor 26. These operations are conducted in the conventional manner. From other operating conditions and the presence/absence of knock, it also determines the ignition timing based on control characteristics established in association with the octane number of the fuel being used (each set of such characteristics being referred to as a "zone" hereinafter). The manner in which this determination is made will be explained later. The microcomputer 54 then issues an ignition command via the I/O circuit 54f and an output circuit 68 to an ignition device 70, thereby causing a spark plug 72 of a prescribed cylinder selected by the distributor 36 to fire and ignite the air-fuel mixture in the associated combustion chamber 20.

The operation of the control system will now be explained with reference to the flowcharts, beginning with FIGS. 3. It should be noted that the present invention is not characterized by the ignition timing control itself but, as explained in the foregoing, by the forcible switchover between sets of control characteristics (referred to hereinafter as "zone reset"). The following explanation will therefore focus on this point. The program according to the flowchart of FIG. 3 is executed by the microcomputer 54 on an interrupt basis at a predetermined crank angle.

Figure 3:
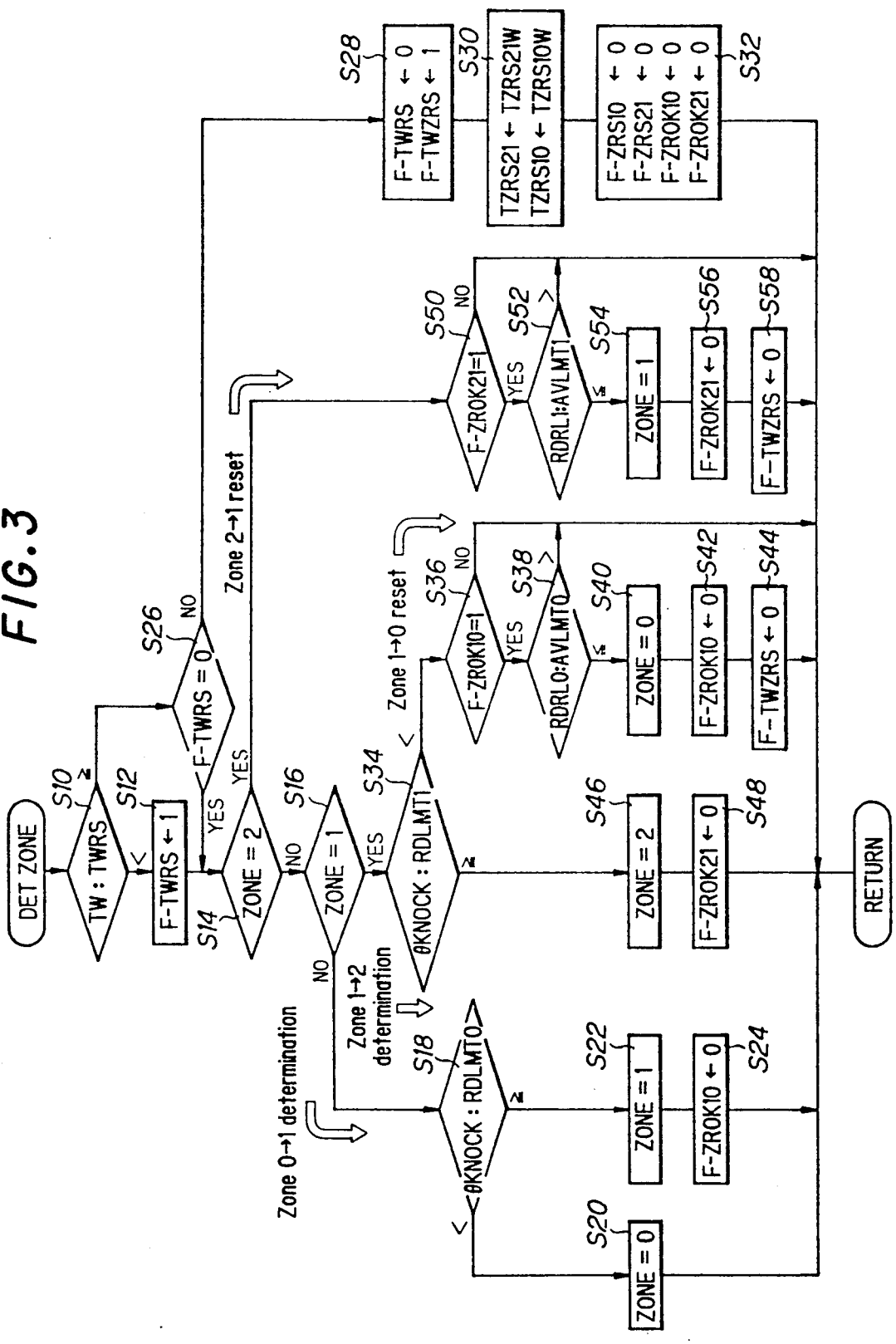
FIG. 3 is a flowchart of a routine carried out in the control unit of FIG. 2 for determining or selecting one among the plural sets of control characteristics preestablished for different fuel octane numbers and for forcibly resetting or shifting from the one to another in a certain condition, in which the characteristics sets are defined as "zones"

Referring to FIG. 3, the procedure begins at step S10 in which the engine coolant temperature TW is compared with a prescribed value TWRS. This prescribed value is of a magnitude appropriate for enabling judgment as to whether engine warmup has been completed and may be set at 60° C., for example. If the engine is still at a low start-up temperature, the result of the judgment in step S10 is negative and the procedure moves to step S12 in which the bit of a flag F-TWRS is set to 1 and then to step S14 where the zone is determined.

The zones will be explained with reference to FIG. 4. In the present embodiment, three zones are established and designated as zone 0, zone 1 and zone 2 in correspondence to the octane numbers of three types of fuel. Zone 0 defines the ignition timing control characteristics for use with a fuel of an octane number of around 100, zone 1 those for use with a fuel of an octane number of around 95, and zone 2 those for use with a fuel of an octane number of around 92. As shown in the figure, the higher the zone number, the more retarded is the ignition timing. The reference symbols AVLMT0, AVLMT1 and AVLMT2 appearing at the left in the figure indicate the upper limit values of ignition timing advance in the respective zones. In zone 2, for example, the ignition timing is basically not allowed to advance beyond AVLMT2. These upper ignition advance limit values are set as a function of the engine speed and the engine load and thus vary with these parameters. The upper ignition advance limit value AVLMT0 is identical with the basic ignition timing. Each of the zones is further assigned a retard side discrimination value RDLMT0,1,2, shown at the opposite in the figure, which is used for zone selection in the manner to be explained later. The retard side discrimination values other than RDLMT2 are set as a function of only the engine speed, and thus vary. The retard side discrimination value RDLMT2 is fixed. The ignition timing knock adjustment value is controlled within one of these zones to fall between the upper ignition advance limit value AVLMTn and the retard side discrimination value RDLMTn (where n is the number of the zone concerned).

Returning to FIG. 3, in step S14, which marks the start of the zone determination process, since no zone has yet been decided in the first program cycle after engine startup, the judgments in steps S14 and S16 are negative, and the procedure thus moves to step S18 in which it is determined whether or not the knock adjustment value θKNOCK (initially zero) is further in the retard direction than the retard side discrimination value RDLMT0. (In the flowcharts of FIG. 3 and higher numbered figures, retard direction values are defined as positive.) In the first program cycle following engine startup, the judgment in step S18 is negative and the procedure advances to step S20, where zone 0 is selected.

The calculation of the knock adjustment value will now be explained with reference to FIGS. 5-9.

The flowchart of FIG. 5 shows an example of how the knock adjustment value is calculated in the retard direction upon the occurrence of knock.

The procedure begins with the judgment of the presence/absence of knock in step S100. When knock is found to be present, the procedure moves to step S102 in which it is determined whether or not a counter value NAFTNK (explained below) remains. As in the first program cycle this value is in its initial zero state, the result of the determination is negative so that the procedure moves to step S104 in which the value NAFTNK is retrieved from the diagram shown in FIG. 6 and is set on the counter. The value indicates the number of firings during which retard adjustment is consecutively carried out. As will be noted in this diagram, this number increases stepwise in proportion as a knock recurrence counter value CKNOCK increases. The counter will be explained later with reference to FIG. 11.

The procedure then advances to step S106 in which it is judged whether or not the consecutive retarded firing number NAFTNK is zero. If not, the procedure advances to step S108 in which this number is decremented by 1, to step S110 in which a unit retard amount DKNOCK is added to the knock adjustment value θKNOCK to adjust it in the retard direction, to step S112 in which it is judged whether or not the adjusted retard target value exceeds the value of the aforesaid maximum retard discrimination value of zone 2, and if it does, to step S114 in which the knock adjustment value is replaced by the maximum retard discrimination value. This replacement is conducted for preventing the exhaust temperature from rising excessively. As is clear from FIG. 5, when the consecutive retarded firing number NAFTNK is set at 2 or a higher value, even if knock is found to be absent at the beginning of the following cycle, ignition retard is continued. (Steps S100, S106, S108 and S110)

Figure 7:
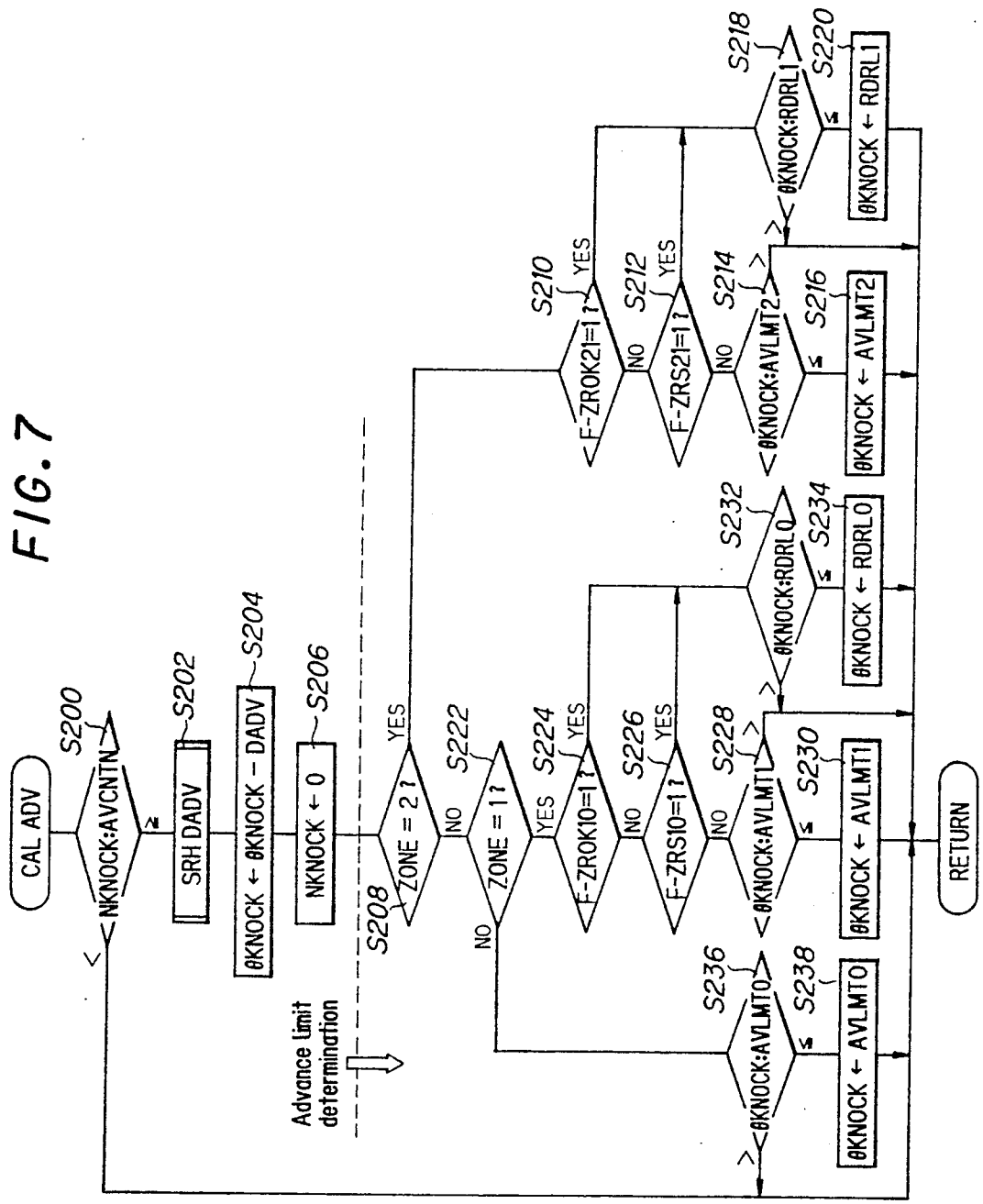
FIG. 7 is a flowchart of a routine for correcting the knock adjustment value in the advance direction.
Figures 8, 9:
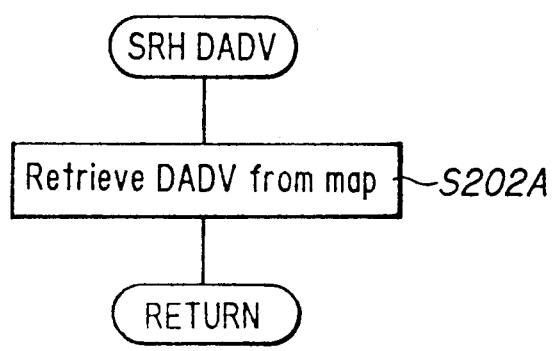
FIG. 8 is a flowchart of a subroutine of the routine of FIG. 7 flowchart, for retrieval of a unit advance amount.
FIG. 9 is a map for explaining the characteristics of the unit advance amount.

FIGS. 7-9 relate to the case where the knock adjustment value is adjusted in the advance direction. When explaining the procedure according to the flowchart of FIG. 7, it starts with step S200 in which it is determined whether or not a counter value NKNOCK exceeds a prescribed firing number AVCNTN. The counter value NKNOCK counts the number of firings in which no knock occurs consecutively and the value AVCNTN means the number of firings during which advance should be deferred. When it is found in step S200 that no knock occurred during the prescribed number of firings, the procedure advances to S202 in which a unit advance amount DADV is determined. FIG. 8 is the flowchart of a subroutine for this purpose, in step S202A of which a unit advance amount is retrieved from the map shown in FIG. 9. As will be noted from this map, the unit advance amount is set as a function of the engine speed NE and the manifold pressure PB (engine load). As will be explained later, zone reset is considered once the knock adjustment value has been adjusted in the advance direction to the point that it reaches the upper advance limit value. Since the upper advance limit value is a function of the engine speed and the engine load and is thus variable, the unit advance amount is likewise made a function of these parameters.

The procedure next goes to step S204 in which the knock adjustment value is reduced by the amount of the retrieved unit advance amount to adjust it in the advance direction, and to step S206 in which the consecutive knock-free firing number counter is reset to zero. In the starting from step S208, a check is conducted in the zone concerned to determine whether or not the adjusted knock adjustment value exceeds the upper advance limit value. Specifically, if it is determined in step S208 that the current zone is zone 2, for example, the procedure passes through steps S210 and S212, in which it is determined that the bits of flags F-ZROK21 and F-ZRS21 (explained later) are 0, to step S214 in which the knock adjustment value is compared with the upper advance limit value for zone 2 and if it is found to exceed this limit value in the advance direction, it is limited to the upper advance limit value in step S216. When the bit of either of the flags is found to be 1 in steps S210 and S212, the procedure goes to step S218 in which the knock adjustment value is compared with a reference value RDRL1 (explained later) and if it is found to be less than this reference value, the knock adjustment value reduced every time the procedure passes through step S204. This will be again referred at a later stage. If it is found to exceed this reference value in the advance direction, it is limited to the reference value in step S220. Again note here that retard direction values are defined as positive. A similar check is conducted in steps S224-S234 if the current zone is zone 1, and in steps S236-S238 if it is zone 0.

The so-determined knock adjustment value is added to the basic ignition timing and the final ignition timing is determined by further addition of other adjustment values such as that for the temperature of the engine coolant. However, as these operations are known to the art and have no bearing on the gist of the present invention, they will not be discussed further here.

Returning to FIG. 3, insofar as it is determined in step S18 that the knock adjustment value does not exceed the retard discrimination value of zone 0, the zone is judged to be zone 0 and the ignition timing is determined accordingly. However, during engine warmup the engine produces a high level of mechanical noise owing to the fact that the pistons hit the cylinder walls more strongly when the engine is cold and the gap between the pistons and the cylinder walls is large and also to the fact that the viscosity of the lubricating oil is high in a cold engine. There is therefore a possibility that this louder noise during warmup may lead to the erroneous detection of knock when none has actually occurred. If this should happen, the knock adjustment value will be adjusted in the retard direction to the extent of exceeding the retard discrimination value of zone 0 in step S18, whereafter the zone will be judged to be zone 1 in step S22. Thus even though the engine is using a fuel with an octane number of 100 which is appropriate for engine operation using zone 0 characteristics, the system could judge the zone to be zone 1, which is further to the retard side than zone 0. Once zone 1 has been selected, the ignition timing will, as explained earlier, be limited by the upper advance value of zone 1, leading to an unnecessary loss of engine output.

For overcoming this problem, the present embodiment of the invention facilitates zone reset at the point where engine warmup has been completed. Specifically, when the engine has warmed up and it is found in step S10 that the coolant temperature exceeds 60° C., the procedure advances to step S26 in which it is determined whether or not the bit of flag F-TWRS is zero. Since this flag was set to 1 in step S12, the result of the determination is negative and the procedure advances to step S28 in which the bit of flag F-TWRS is reset to 0 and the bit of flag F-TWZRS is set to 1, to step 30 in which the values of timers TZRS21 and TZRS10 are replaced with prescribed values TZRS21W and TZRS10W, and to step 32 in which the bits of flags F-ZRS10, F-ZRS21, F-ZROK10 and F-ZROK21 are reset to 0. (Flag F-ZROK10 is also rest to 0 after zone 1 is selected in step S22.) These flags and timers will be explained later.

Figure 10:
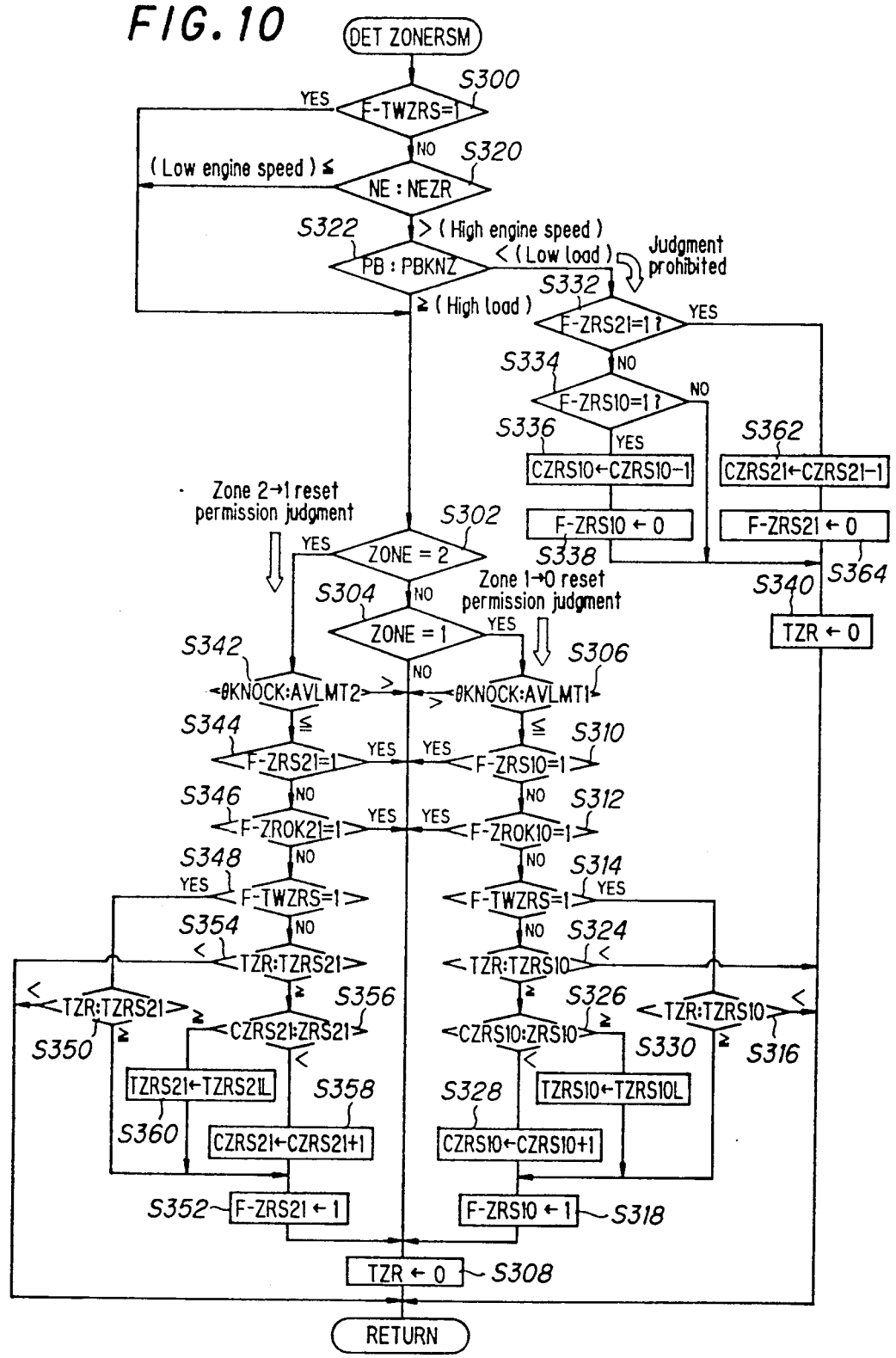
FIG. 10 is a flowchart of a routine for showing zone reset judgment permission.
Figure 11:
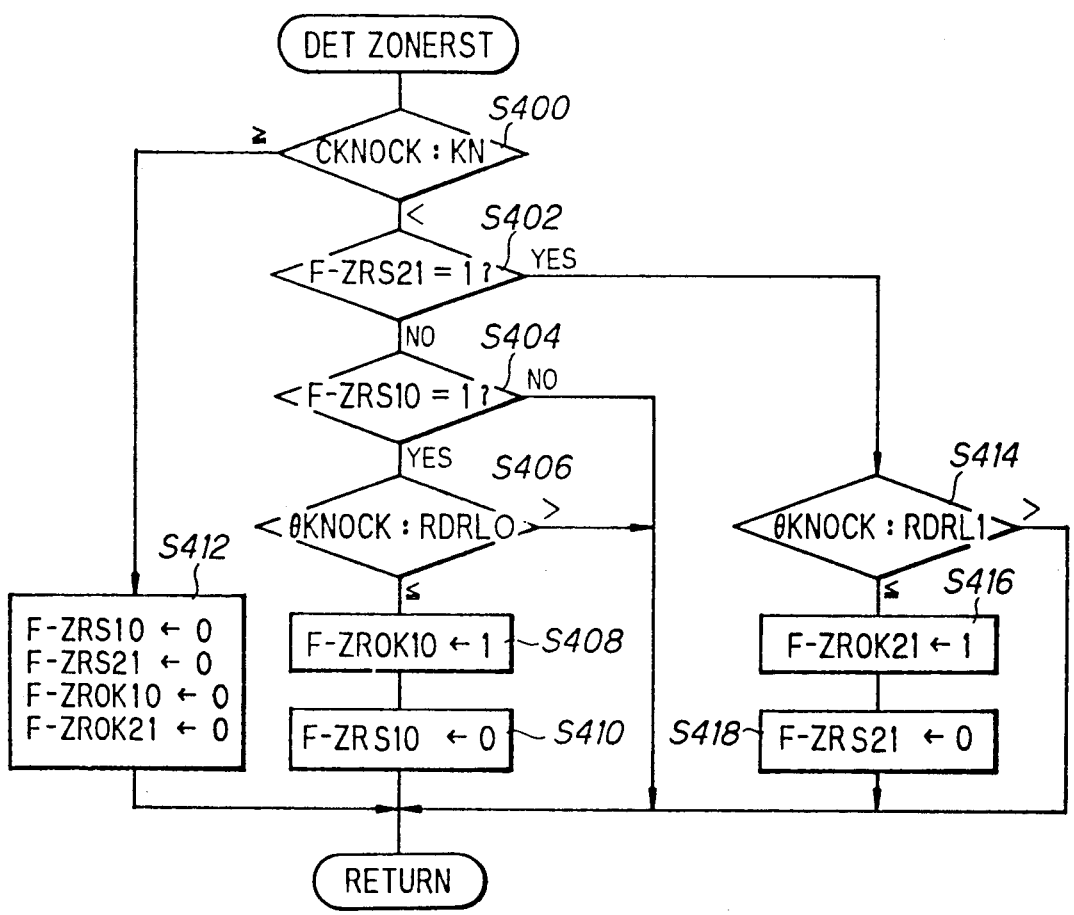
FIG. 11 is a flowchart of a routine for showing zone reset permission carried out after the judgment is permitted in the routine of FIG. 10 flowchart.

Zone reset judgment is cooperatively conducted by the procedures indicated by the flowcharts of FIG. 10 and FIG. 11. FIG. 10 shows the procedures for issuing permission to carry out zone reset judgment (turn-on of the bits of flags F-TWZRS, F-ZRS21 and F-ZRS10) and FIG. 11 the procedures for, upon receipt of this permission, permitting zone reset (turn-on of the bits of flags F-ZROK21 and F-ZROK10). It should be noted, however, actual zone reset carried out under prescribed conditions in the flowchart of FIG. 3 after receiving the zone reset permission.

The procedure according to FIG. 10 starts with step S300 in which it is confirmed whether or not the bit of flag F-TWZRS is on (this flag indicating that zone reconsideration has become permissible owing to the fact that the engine has passed from the initial low-temperature operating state to the warmed up state, namely that the coolant temperature has risen to over 60° C.). When the result of this confirmation is affirmative, the procedure advances to step S302 in which the current zone is determined. As explained earlier, presuming that zone 1 has been misselected, the result of the determination in step S302 will be negative, the result of the determination in step 304 will be affirmative, whereafter the procedure will advance to step S306 in which determination is made as to whether or not the ignition timing has returned to the upper advance limit value of zone 1. If the result of the determination is negative, the procedures goes to step S308 in which a timer TZR (explained later) is reset (started), concluding the current program cycle. What this means is that permission to conduct zone reset judgment is not issued until the ignition timing has returned to the upper advance limit value.

When it is found after a number of program cycles that the ignition timing has returned to the upper limit value, the procedure advances to step S310 in which it is determined whether or not the bit of the flag F-ZRS10 is on. Since the bit of this flag was turned off earlier in step S32 of the flowchart of FIG. 3, the determination here is negative and the procedure moves to step S312 in which it is similarly confirmed that the bit of the reset permission flag is off, to step S314 in which it is confirmed that the reset judgment permission flag is on owing to completion of engine warmup, to step S316 in which the value of the timer TZR is compared with the prescribed value TZRS10 and execution of the program is suspended until the prescribed time period has passed.

In other words, this timer measures time lapsed from the time at which the ignition timing has returned to the zone upper limit. The prescribed value TZRS10 is set at, say, 5 seconds. The value with which TZRS10W is replaced in step S30 of the flowchart of FIG. 3 as mentioned earlier is of a shorter length on the order of 2 seconds. In other words, since, as was explained at the start, hunting could apt to occur if zone reset is carried out simply, for example, as soon as the upper ignition advance limit value AVLMTn is reached, the present invention is constituted so as to implement zone reset only after various conditions have been satisfied. The fact that zone resetting is not conducted in this invention even after the required conditions have been met, until after it has been confirmed that the operating condition has normalized and that no knock occurs during the aforesaid prescribed time, is a further aspect of the high level of caution the invention uses regarding zone reset. However, since the aim of the zone reconsideration at the time of warmup completion is to provide relief in the case of zone misselection resulting for spurious knock detection, the prescribed time period for this determination is made short.

After the program has gone through a number of cycles and it is found that in step S316 that two seconds have passed, the procedure advances to step S318 in which the bit of flag F-ZRS10 is turned on (indicating zone reset judgment permission is established), and then to step S308 in which the timer value is reset and the program is terminated. The numeral 10 appended to this flag symbol is for indicating determination permission relating to a reset between zone 1 and zone 0.

Upon issuance of the zone reset judgment permission, procedure for issuance of zone reset permission is carried out in accordance with the flowchart of FIG. 11. Specifically, this procedure begins with step S400 in which it is determined whether or not the knock recurrence counter value CKNOCK is less than a prescribed value KN. At this time the determination of knock recurrence is conducted based on the number of firings in which knock occurs out of a prescribed number of firings. For example, it is determined whether or not there were two firings in which knock occurred among a total of 120 firings. When it is found in step S400 that the number of knock occurrence recurrences is less than the prescribed number, the procedure moves to step S402 in which it is determined whether or not the reset judgment permission has been established with respect to resetting from zone 2 to zone 1. Since at this point the permission has been established with respect to resetting from zone 1 to zone 0, the result of the determination in step S402 is negative and the determination in the following step S404 is affirmative. Thus after it is confirmed in step S406 that the knock adjustment value has advanced to the reference value RDRL0, the procedure advances to step S408 in which the bit of flag F-ZROK10 is set to 1 (indicating zone reset permission is established) and then to step S410 in which the same bit is turned off since the zone reset determination permission flag is no longer needed.

This will be explained with reference to FIG. 12 which, by way of example, relates to the case of reset from zone 1 to zone 0. In this embodiment, zone reset is conducted when the following conditions have been established:

1) Adjustment value θKNOCK has advanced to the upper ignition advance limit value AVLMT1 of the zone (Step S306 in FIG. 10). (Point 1)

2) A prescribed time period TZRS10 (or TZRS10W) has passed after 1). (Step S316 in FIG. 10.) (Point 2)

3) At this point the zone reset judgment permission (F-ZRS10=1) is issued at step S318 and the ignition timing is advanced in increments of unit advance amount DADV, if no knock occurs as was shown with reference to steps S204, S226, S232 in FIG. 7.

4) At the point of time when the ignition timing has advanced to the reference value RDRL0, the zone reset permission (F-ZROK10=1) is issued (Steps S406, S408 in FIG. 11). (Point 3)

5) Following a period of waiting for the engine operation condition to change and when it is detected that the reference value RDRL0 has come to coincide with the upper advance limit AVLMT0 of the next zone, actual reset from zone 1 to zone 0 is conducted (Steps S36–S44 in FIG. 3). (Point 4)

Figure 4:
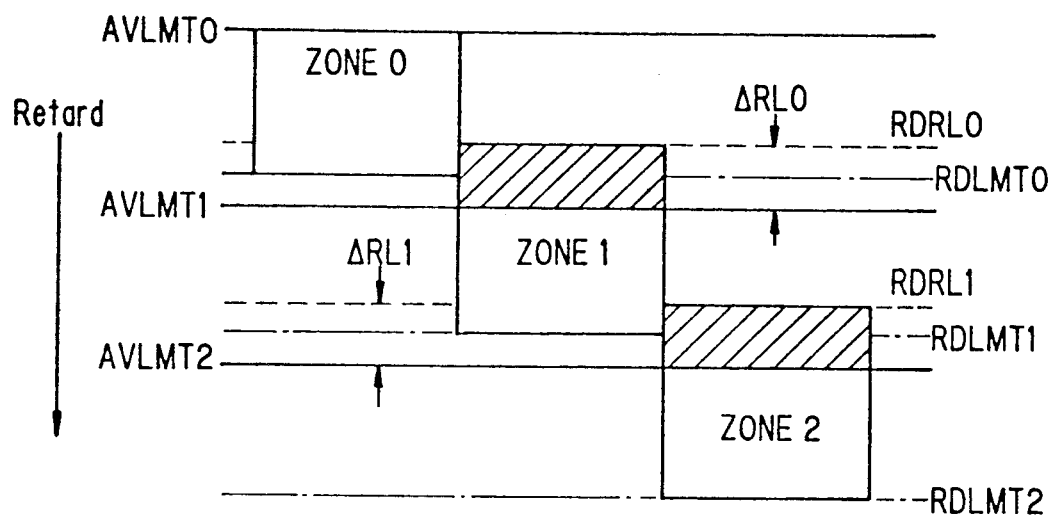
FIG. 4 is a diagram for explaining the zones.
Figure 6:
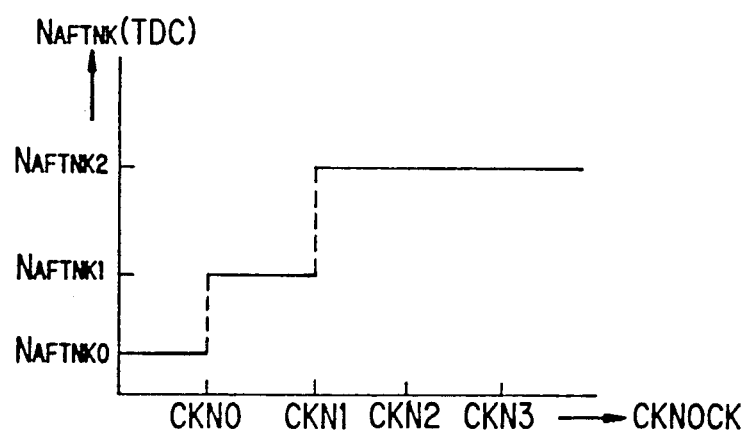
FIG. 6 is a diagram for explaining a consecutive retarded firing number used in the routine of FIG. 5.

While as shown in FIG. 4 the reference value RDRL0 is set by Delta RL0 in the advance direction from the upper advance limit of zone 1, it should be noted that it differs from the upper advance limit of zone 0. However, since these upper limit values vary with engine speed and engine load, they become the coincident in the low engine load operating region where the accelerator pedal has been released, for example. The invention therefore prevents actual reset from being carried out when they are coincident in order to avoid a sudden change in the ignition timing characteristics. (It should be noted that the same applies to the reference value for zone 2, namely that RDRL1=AVLMT2−Delta RL1.) And as indicated by the broken line marked "A" in FIG. 12, when knock occurs in the course of ignition advance and the number of recurrences thereof is found to have reached or exceeded the prescribed value, the zone reset procedure is discontinued (Step S400, S412 in FIG. 11).

Further, as shown in FIG. 3, at the point where engine warmup is completed, reset permission is confirmed in step S36, whereafter the procedure moves to step S38 in which it is confirmed that the upper advance limit of the next zone has come to coincide with the reference value, to step S40 in which the zone is reset from 1 to 0, to step S42 in which the bit of flag F-ZROK10 is turned off, and to step S44 in which the bit of flag F-TWZRS is turned off. As a result, zone reset based on completion of engine warmup is conducted only once, namely at the time of the transition from the initial low-temperature operating state to the warmed-up state, and is not conducted again at any time while the engine remains in operation.

Zone reset caused by other than engine warmup will now be explained.

When warmup has been completed, the result of the confirmation in step S300 of FIG. 10 is negative, the procedure advances to step S320 in which the engine speed NE is compared with a prescribed engine speed NEZR. This prescribed engine speed is a low one on the idling speed level.

When it is determined in step S320 that the engine speed is above the idling range, the procedure advances to step S322 in which the engine load is determined by comparing the intake pressure PB with a prescribed value PBKNZ. This prescribed value is appropriately set at one adequate for enabling discrimination of high-load operating state. As shown in the characteristic diagram of FIG. 13, the prescribed value PBKNZ varies with the engine speed, whereby zone reset can be determined in the operating region in which knock is even more apt to occur and the appropriateness thereof can be confirmed more suitably. When it is found in step S322 that the engine is in a high-load state, the procedure advances to step S302 and the ensuing steps for judgment of zone reset at high-load operation.

Taking the case of reset from zone 1 to zone 0 as an example, when the result of the determination in step S302 is negative, the procedure advances to step S304 in which the result of the determination is affirmative, and to step S306 where the procedure waits for the adjustment value θKNOCK to reach the upper advance limit value of zone 1. Upon confirmation in step S306 that the upper advance limit value has been reached, the procedure passes through steps S310, S312 and S314 to step S324, in which a check is made as to whether the timer value indicates the passage of the prescribed time (5 seconds). When it has been confirmed that the prescribed time has lapsed, the procedure advances to step S326 in which the value CZRS10 of a counter for counting the number of reset judgment permissions issued is compared with a prescribed value ZRS10. This number of reset judgment permissions indicates the number of times in which, after judgment permission was once established, the reset procedure was discontinued because knock recurred the prescribed number of times or more, and the prescribed value ZRS10 is appropriately set at, for example, five times. The first time this step is executed, the result of the determination is naturally negative and the procedure advances to step S328 in which the counter value is incremented, and to step S318 in which the bit of the reset judgment permission flag is set to 1, completing the first cycle of the routine.

Figure 13:
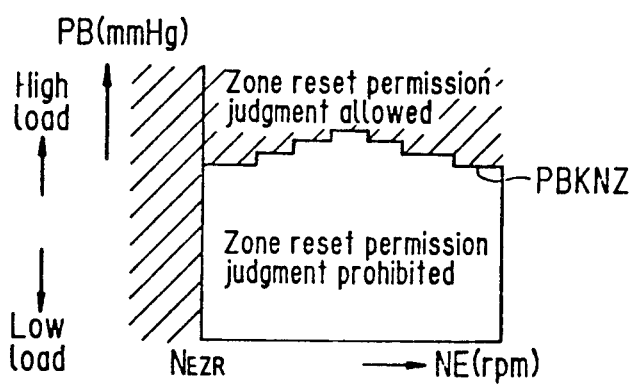
FIG. 13 is a graph for explaining a zone reset judgment permission region.

When zone reset permission is issued in step S318 and after it has been confirmed through steps S404–S410 of the flowchart of FIG. 11 that the knock adjustment value has reached the reference value, zone reset is conducted through steps S36–S44 of the flowchart of FIG. 3, after waiting for confirmation at S38 that the upper limit of zone 0 has become equal to the reference value. In other words, as indicated in FIG. 13, decision to conduct zone reset is made in the high-load region above a prescribed engine speed. On the other hand, zone reset is conducted in the low-load region where the reference value coincides with the upper advance limit.

Figure 12:
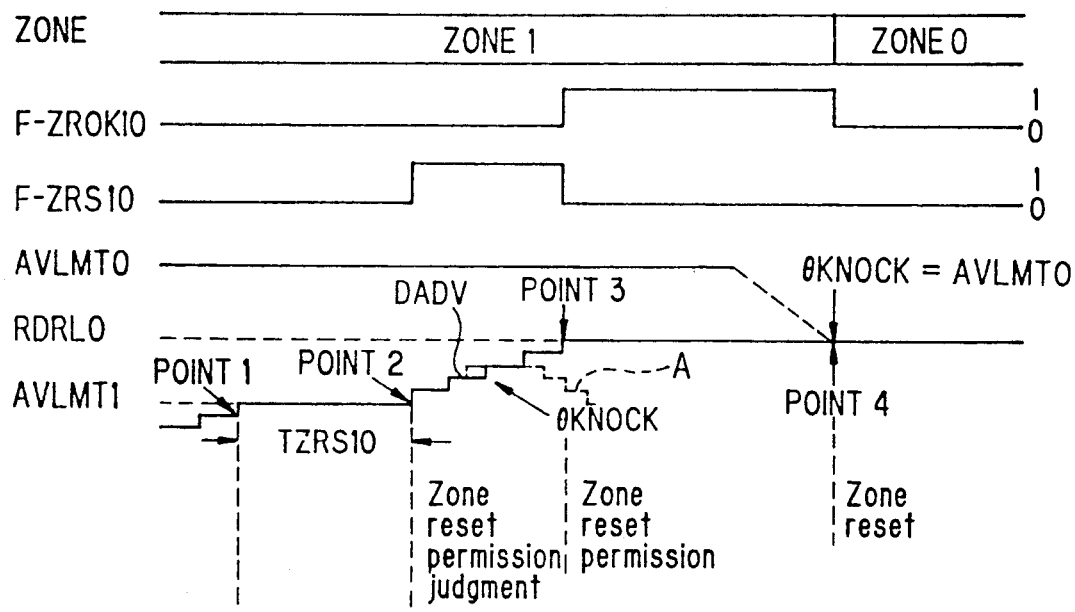
FIG. 12 is a timing chart for explaining zone reset.

However, occurrence of knock may cause the adjustment value to turn in the retard direction as illustrated by the dotted line A in FIG. 12 and if knock recurs beyond the rate defined at step S400 in FIG. 11 flowchart, the flag bit of F-ZRS10 is turn off at step S412 in the same figure. At that situation, time measurement is resumed again when the adjustment value has returned to the zone 1 upper limit. And after the time has lapsed, the counter value is again incremented to "2" and so on and the flag bit is again set to 1 (S306, S308, S310, S312, S314, S324, S326, S328, S318 in FIG. 10). The procedure then goes to FIG. 3 flowchart and waits the chance to reset zone. However, if it is determined in step S322 that a high load is not present, the procedure passes through steps S332–S340, the counter value is decremented, the flag bit is turned off and the timer value is reset.

If it still remains failing zone reset and when after some number of cycles it is found in step S326 that the counter value has reached the prescribed value (number of times), the procedure moves to step S330 in which the timer value TZRS10 (e.g., 5 seconds) is rewritten to TZRS10L (e.g., 25 seconds). This change is for making it more difficult for the zone reset permission to be established, and is implemented in light of the fact that where the occurrence of knock causes the procedure to be discontinued each time zone reset is attempted, the reason can be presumed to be that the engine is operating on low octane number fuel. In such a case, it can be expected that even if zone reset is conducted the system will thereafter return to the original zone, resulting in frequent changes in the ignition timing control characteristics. In such an operating state it is therefore preferable to make it difficult for zone reset to be established so as to prevent this type of hunting.

While only reset from zone 1 to zone 0 is discussed in the foregoing, the situation regarding reset from zone 2 to zone 1 is basically the same. At first, when it is found in step S34 of FIG. 3 that knock adjustment value has exceeded the retard side discrimination value RDLMT1 of zone 1, the procedure advances through steps S46–S48 so that zone 2 is selected. The ignition timing is thereafter controlled based on the ignition timing characteristics of this zone. If in this condition it is found that engine warmup has been completed (step S300 in FIG. 10) or that the engine load has become high (step S322 of FIG. 10), zone reset judgment permission is established as the procedure passes from step S302 through the steps S342–S360 (and through occasionally steps S362 and S364) of the FIG. 10 flowchart, zone reset permission is established through the steps S400, S402 and S414–S418 of the flowchart of FIG. 11, and reset to zone 1 is carried out after is has been found through steps S50–S58 of the FIG. 3 flowchart that coincidence has arisen between the reference value RDRL1 of zone 2 and the upper ignition advance limit value AVLMT1 of zone 1.

Differently from the case of the arrangement proposed earlier by the assignee in which zone reset is decided on the basis of a prescribed engine speed, with this arrangement according to this invention zone reset can be conducted even when a zone misselection is made during acceleration, without waiting for the engine speed to decrease. Moreover, in the case where the engine is operating on a low octane fuel and zone 1 (or 2) has been properly selected, indiscriminately conducting zone reset when the engine speed decreases will result in the occurrence of knock in the upper zone to which reset is made and this will lead to the zone being changed again. In this invention, however, since, as explained above, the ignition timing is advanced by the prescribed increment to enable the judgment to be made in the high-load region in which knock is apt to occur and shift to more advanced characteristics is carried out only when it has been confirmed that knock does not occur in the process of ignition timing advance, it becomes less likely that zone reset will be carried out during use of a low octane fuel, whereby hunting is prevented. And the zone reset itself is carried out in the low-load region at which the upper advance limit comes to coincide with the reference value, the shift will not cause sudden change in ignition timing so that any unpleasant feeling owing to sudden torque change will not occur. It should be noted here that, in a case where high octane number fuel is in use but is misidentified as low octane number fuel, no inconvenience arises even if zone reset control is not conducted in the low-load region, since almost no torque loss exists in the low-load region. The wait time is provided before starting advancing and the wait time is then extended when knock recurs repeatedly so as to carefully check appropriateness of zone reset.

In the embodiment just described, while the timer values in the flowchart of FIG. 10 (S316, S324, S350, S354) are expressed in terms of time, they may alternatively be expressed in terms of number of firings.

Figure 14:
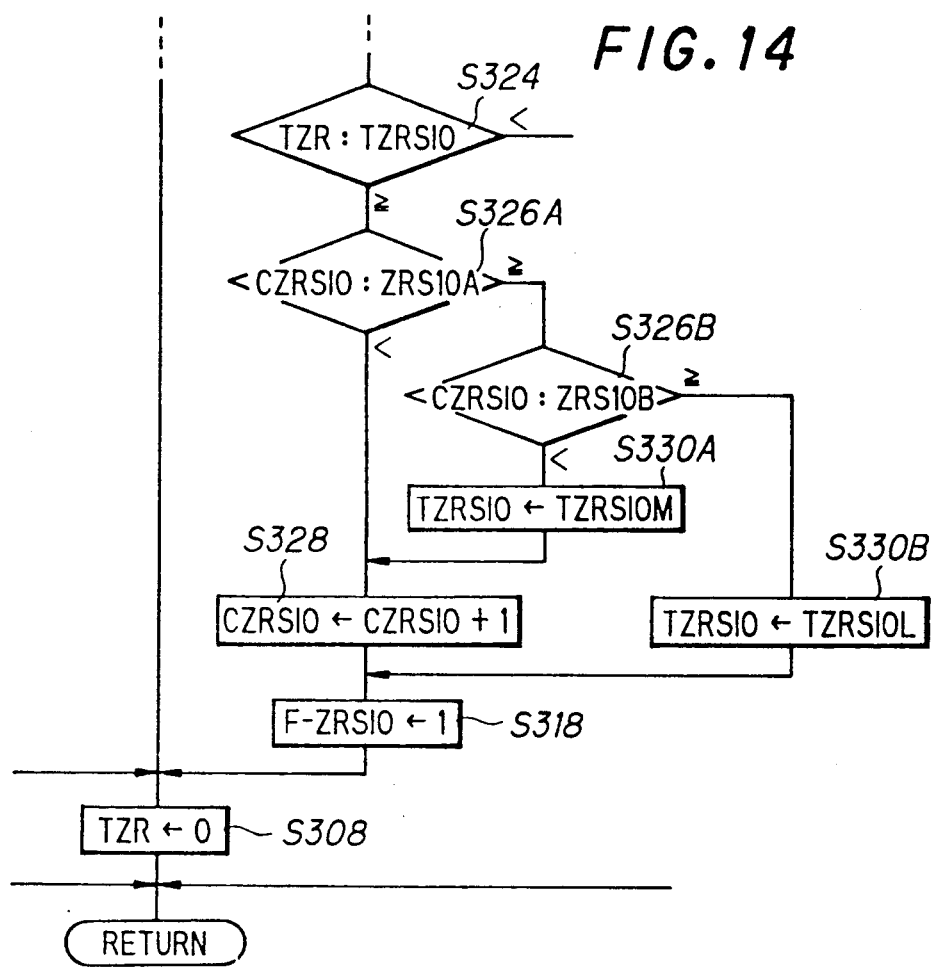
FIG. 14 is a fragmentary flowchart of a routine illustrating the second embodiment according to the present invention.

FIG. 14 shows the second embodiment of the invention. Focussing on the difference between the embodiment and the first one, in a fragmentary flowchart of FIG. 14 similar to that in FIG. 10, the former steps S326 and S330 are now changed as S326A and S330A, and new steps S326B and S330B are added.

After time lapse is confirmed at S324, the procedure advances to step S326A in which the counter value is compared with a first reference value ZRS10A (e.g., 3 times) and if it is found to exceed, the procedure then goes to another judge step S326B in which the counter value is again compared with a second reference value ZRS10B (e.g., 5 times). If it does not exceed, the procedure moves to step S330A in which the timer value TZRS10 (e.g., 5 seconds) is rewritten to TZRS10M (e.g., 20 seconds), whereas if it is found to exceed at step S326B, the once rewritten timer value is again renewed as TZRS10L (e.g., 25 seconds) at step S330B.

Thus, it is possible to make it difficult, in a more suitable manner, for zone reset to be established in responsive with the knock recurrence state so as to prevent the hunting. It will be easily understood from the above that the timer period can be further varied depending on the number of times counted. For example, it can be 20 seconds for 3 times, 25 seconds for 5 times and 30 seconds for 7 times. These values can, of course, also be expressed in terms of number of firings. The rest of the second embodiment is the same as the first embodiment.

Figure 15:
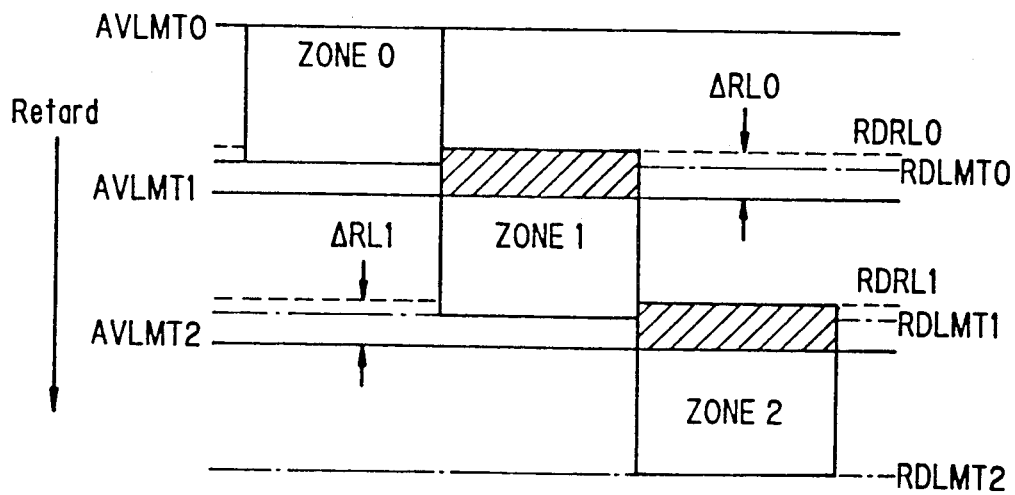
FIG. 15 is a diagram, similar to FIG. 4, but showing the third embodiment according to the present invention.

FIG. 15 shows the third embodiment of the invention. The values Delta RL0 and Delta RL1 explained in the first embodiment with respect to FIG. 4 can be either fixed or variable values. With the particular aim of facilitating zone reset judgment upon completion of engine warm-up, the values Delta RL0,1 is shortened, i.e., the hatched portions are narrowed in the third embodiment in contrast with those in the first embodiment. It may possible to achieve the same purpose by shorten the aforesaid unit advance amount DADV (S202A in FIG. 8 flowchart), so as to speed up the arrival of the ignition timing at the reference value RDRL1 or RDRL1, when making the reset judgment upon completion of engine warmup.

The present invention has thus been shown and described with reference to the specific embodiments. However, it should be noted that the present invention is in no way limited to the details of the described arrangements but changes and modifications may be made without departing from the scope of the appended claims.

What is claimed is:

1. A system for controlling ignition timing of a vehicle internal combustion engine, including:
    first means for detecting operating conditions of the engine including at least engine speed and engine load;
    second means for detecting knock occurring in the engine;
    third means for establishing a plurality of sets of ignition timing control characteristics for different fuel octane numbers including at least a first set of characteristics for fuel having a prescribed octane number and a second set of characteristics for fuel having a greater octane number;
    control means for inferring the octane number of fuel being used from the detected occurrence state of knock and selecting one set of control characteristics corresponding thereto, and for determining ignition timing based on the selected set of characteristics in response to the detected engine operating conditions and the occurrence state of knock; and
    ignition means for igniting an air-fuel mixture in a combustion chamber of the engine;
    wherein the improvement comprises:
    said control means, after determination of the ignition timing based on the first set of characteristics, advancing the ignition timing by a prescribed amount if the engine load is found to be above a predetermined load, and shifting the selected set of characteristics from the first set to the second set when it has been confirmed that no knock occurred in the course of the advancement.

2. A system according to claim 1, wherein said control means shifts the characteristics when the engine load is found to be below the predetermined load.

3. A system according to claim 1, wherein said predetermined engine load varies with the engine speed.

4. A system according to claim 2, wherein said predetermined engine load varies with the engine speed.

5. A system according to claim 1, wherein said prescribed advance amount varies with the engine speed and the engine load.

6. A system for controlling ignition timing of a vehicle internal combustion engine, including:
    first means for detecting operating conditions of the engine including at least engine speed and engine load;
    second means for detecting knock occurring in the engine;
    third means for establishing a plurality of sets of ignition timing control characteristics for different fuel octane numbers including at least a first set of characteristics for fuel having a prescribed octane number and a second set of characteristics for fuel having a greater octane number;
    control means for inferring the octane number of fuel being used from the detected occurrence state of knock and selecting one control characteristics corresponding thereto, and for determining ignition timing based on the selected set of characteristics in response to the detected engine operating conditions and the occurrence state of knock; and
    ignition means for igniting an air-fuel mixture in a combustion chamber of the engine;
    wherein the improvement comprises:
    said control means, after determination of the ignition timing based on the first set of characteristics and if the ignition timing has reached an advance limit of the first characteristics, advancing the ignition timing towards a reference limit which is more advanced than the advance limit, and shifting the selected set of characteristics from the first set to the second set when it has been confirmed that no knock occurred in the course of the advancement.

7. A system according to claim 6, wherein said control means begins to advance the ignition timing when the engine load is found to be above a predetermined load.

8. A system according to claim 7, wherein said control means shifts the characteristics when the engine load is found to be below the predetermined load.

9. A system according to claim 7, wherein said predetermined load varies with the engine speed and the engine load.

10. A system according to claim 8, wherein said predetermined load varies with the engine speed and the engine load.

11. A system according to claim 6, wherein said control means includes fourth means for measuring time lapse by time or by number of firings after the ignition timing has reached the advance limit of the first set of characteristics and when the measured time lapse has reached a value representing a predetermined period, said control means shifts the selected set of characteristics from the first set to the second set.

12. A system according to claim 11, wherein said control means further includes fifth means for counting the number of times the ignition timing has reached the advance limit of the first set of characteristics and when the counted value reaches a reference counter value, said control means extends said predetermined period.

13. A system according to claim 11, wherein said control means further includes fifth means for counting the number of times the ignition timing has reached the advance limit of the first set of characteristics and comparing the counted number with a plurality of reference counter values, and said control means extends said predetermined period in response to the result of the comparison.

14. A system according to claim 6, wherein said advance limit of the first set of characteristics and an advance limit of the second set of characteristics vary with the engine operating conditions and when the ignition timing has reached or exceeded the advance limit of the second set of characteristics beyond the advance limit of the first set of characteristics, said control means shifts the selected set of characteristics from the first set to the second set.

15. A system according to claim 14, wherein said control means shifts the characteristics when the engine load is found to be below a predetermined load.

16. A system according to claim 15, wherein said predetermined load varies with the engine speed and the engine load.

17. A system according to claim 6, wherein said control means confirms that no knock has occurred in the course of advancement when a knock occurrence rate was found to be below a prescribed rate.

18. A system according to claim 6, wherein said control means advances the ignition timing in a prescribed unit amount.

19. A system according to claim 18, wherein said prescribed unit amount varies with the engine speed and the engine load.

* * * * *